Figure 1:
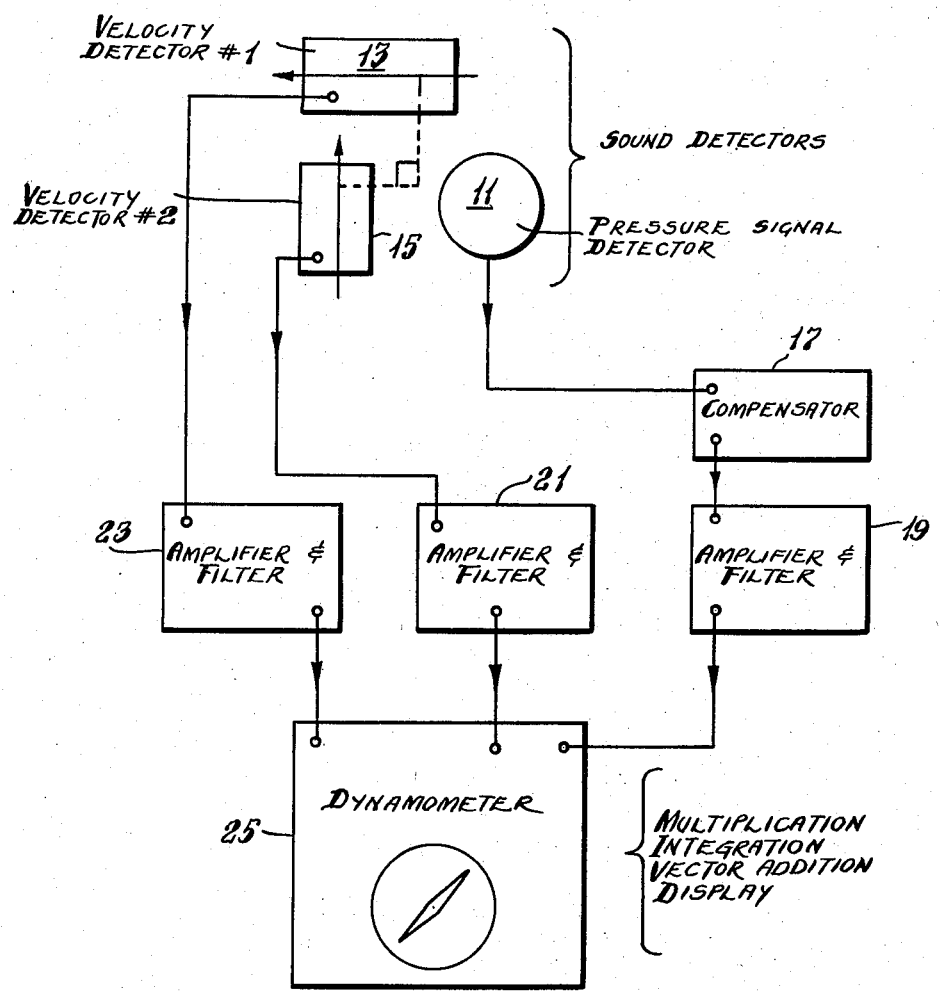

United States Patent Office 2,876,858
Patented Mar. 10, 1959

2,876,858
DYNAMOMETERS

Stanley N. Heaps, Dallas, Tex., assignor, by mesne assignments, to the United States of America as represented by the Secretary of the Navy Application December 5, 1956, Serial No. 626,554

3 Claims. (Cl. 181—26)

This invention relates to improvements in dynamometers, and more particularly pertains to improvements in bearing indication instruments adapted to respond to subaudible or audible sound or vibrations generated in the sea by surface or underwater craft, by the splash of falling objects, or by underwater explosions. When actuated by signals from suitable sound detectors, the device senses the flow of acoustic energy in the presence of random transient noises, averages the value of this flow for a short time, adds the two perpendicular components of this flow (the components of acoustic intensity) and displays the direction from which the sound is coming.

Acoustic intensity is a vector quantity with a sense that indicates the direction of energy flow. Apparatus responding to true intensity must therefore have the means for sound direction computation or display. Underwater sound waves consist of pressure variations and vibratory motion of the water. Both pressure and vibration velocity have the same wave form. The product of these two quantities at any moment can be considered as an instantaneous value of the sound intensity, with its sense determined by that of the velocity. Since the sound waves are longitudinal vibrations, this velocity amplitude direction is aligned with the direction of the progression of the sound wave fronts themselves.

Intensity also can be considered as a flow of energy, expressed as ergs per second per square centimeter. This flow can be averaged over a period of time to give a net direction of flow even in the presence of numerous sound sources of random position. Thus, an indication of the direction of wave progression or energy flow can be called an acoustic bearing. Since no net flow of energy results from the random sound sources, good bearing indication can be expected under poor conditions of signal-to-noise amplitude ratio.

Acoustic bearing determination has been accomplished in the past by means of an electronic system comprising a multiplier utilized to give instantaneous values of the product of acoustic pressure and acoustic particle velocity signals; a filter or integrator for averaging this product over a short time to give voltages proportional to the two horizontal components of intensity; a cathode ray tube or oscilloscope to display such voltages as magnitudes of direction; and a chopper to establish a zero point or "no-signal" reference position. Such an electronic system has the evident disadvatnages of complexity and of having the time constant of integration as the same value for both strong and weak acoustic signals. The subject invention overcomes these disadvantages by providing a simple instrument wherein torques are made proportional to acoustic intensities involving both magnitude and direction.

The principal object of this invention is to provide improvements in dynamometers adapted for use in acoustic bearing systems, for finding the bearing of underwater sound sources.

Figure 2:
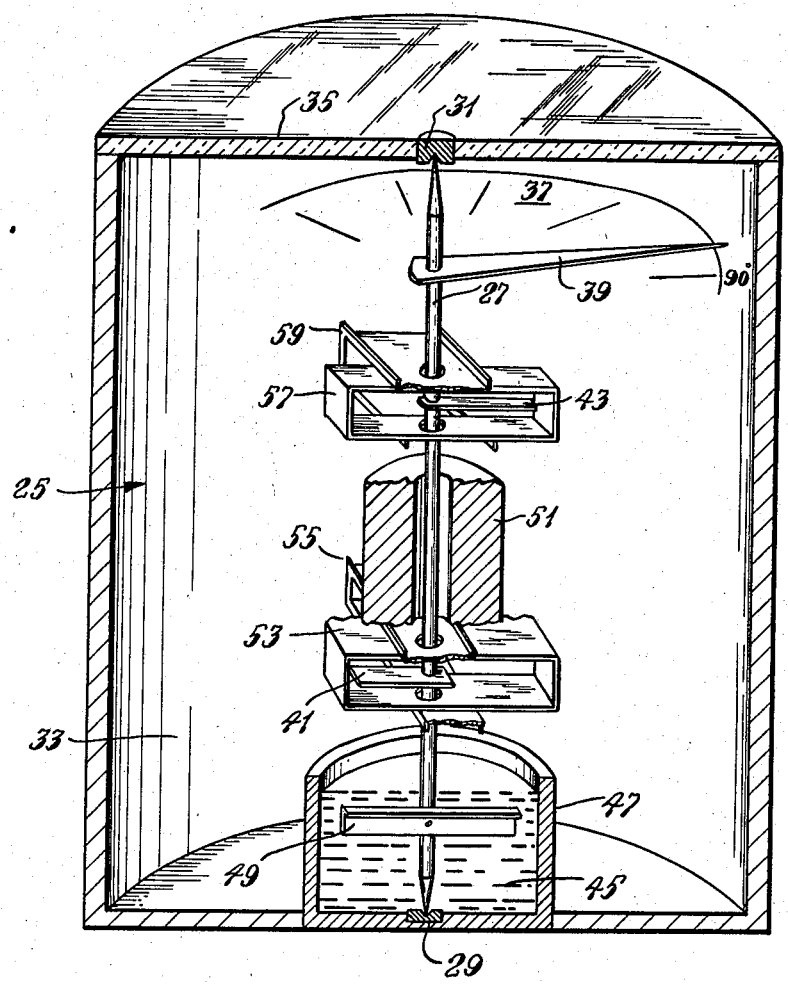

Other objects and many of the attendant advantages of this invention will be readily appreciated as the same becomes better understood by reference to the following detailed description when considered in connection with the accompanying drawings wherein:

Fig. 1 is a block diagram of a sonic bearing system in which the dynamometer of the subject invention can be employed; and Fig. 2 is a sectional perspective view of a dynamometer, showing a preferred embodiment of the invention.

Similar numerals refer to similar parts throughout the several views.

In the sonic bearing system shown in Fig. 1, a nondirectional pressure signal detector 11, a first velocity detector 13 and a second velocity detector 15 are mounted suitably at the same place under water. The detectors 13 and 15 have mutually perpendicular orientation of their lobes of maximum sensitivity. A compensator 17 in the pressure signal channel gives this channel the same amplitude and phase characteristics as the velocity channel. Signals from the compensator 17 and from detectors 13 and 15 are fed through amplifiers and filters 19, 23 and 21 respectively to the dynamometer 25, which multiplies the appropriate signals, integrates the products over a period of time, adds the two vector components of intensity thus formed, and displays the result as a bearing indication, by the means hereinafter described.

The dynamometer shown in Fig. 2 comprises an iron vane vertical shaft 27 that is free to turn in a lower jewel bearing 29 and an upper jewel bearing 31, the bearings 29 and 31 being mounted in a metal container 33 having a top window 35. Dial 37 is secured in said container normal to the axis of shaft 27, and said dial, said bearing 31 and a pointer 39 affixed to shaft 27 are visible from above.

Lower vane arm 41 and upper vane arm 43 are carried by shaft 27. The lower end of the shaft 27 and the bearing 29 are immersed in the oil 45 carried in a dash pot 47, the shaft 27 mounting a damping fin 49 that is restrained from rotation by the oil 45. The shaft 27 passes through the center of a vane coil 51, which is located between the vane arms 41 and 43. Lower field coil 53 encases vane arm 41, and a second lower field coil 55 is disposed at right angles to coil 53 and encases coil 53 to provide a magnetic field perpendicular to the field of coil 53. Similarly, identical upper field coil 57 encases vane arm 43, and a second upper field coil 59 is disposed at right angles to coil 57 and encases coil 57 to provide a magnetic field perpendicular to the field of coil 57. These four field coils 53, 55, 57, 59 are secured to the housing. The lower coil 53 and upper coil 57 have the same orientation, and the lower coil 55 and the upper coil 59 have the same orientation. Upper and lower field coils with the same orientation are connected in series to form one velocity signal circuit that produces two equivalent fields at the upper and lower vane arms. The other velocity circuit is similar except that the associated magnetic fields are perpendicular to those of the first velocity coils. The resultant field at each vane arm thus depends on the instantaneous polarity and relative amplitudes of the two velocity signal currents.

The two horizontally sensitive velocity detectors 13 and 15, which are set in the underwater sound field with mutually perpendicular orientation of sensitivity axes, provide the signals for these field coils. The magnitude of each velocity component of the sound field gives rise to a corresponding component of magnetic field strength in the dynamometer. The resultant field at each arm is thus equivalent to the sound velocity with respect to magnitude and direction. Pressure sensitive detector 11, located in the sound field at the same point as detectors 13 and 15, energizes the vane coil 51 to produce poles on the vane arms with the intensity of magnetization dependent upon the sound field pressure. The torques are proportional to the product of the pole strength of the vane and the field strength produced by the field coils, and therefore are proportional to the product of the pressure and velocity amplitudes of the sound field.

The vane 27 turns like a compass needle to a position of zero torque. This is the position where the vane arms line up with the magnetic field due to the velocity signal coils. Hence the pointer stops in a position representing the direction of travel of the sound wave producing the signals.

The torque on the vane is proportional to the instantaneous product of the sound pressure and velocity, and therefore tends to pulsate. The vane's inertia prevents it from responding to these pulsations, and its motion therefore is more dependent on an average value of the product. The torque producing the motion is thus proportional to the sound intensity, and additional damping is obtained by the fin 49 in the oil dash pot 47, thereby increasing the averaging time.

The system is insensitive to noise from numerous sources of random positions by virtue of three effects. Such noise can produce out of phase current relationships between vane and field coils which produce no net torque on the vane shaft 27. Such noise can produce out of phase current relationships between the crossed field coils to cause rotating components of magnetism in the field which are too rapid for the vane to follow. Finally, such noise provides no net flow of energy over any great length of time. The final position of the pointer 39 is the result of integration of all torques over a time of a few seconds. The torques due to such random noise are small, whether the noise is acoustic or electrical. Good operation under conditions of poor signal-to-noise ratio is therefore to be expected.

The maximum and minimum power requirements of the dynamometer are related to the acoustic signals and to noise. The noise signal currents present in the coil cause heating, but produce no bearing indication. Simultaneous weak sound signal currents must produce sufficient torque to operate the device. The dynamic range of power—the degree to which noise and signal can be present simultaneously and still have satisfactory operation—is the ratio of power for normal heating to the power required for a small movement of the vane. Since no torque is produced when the vane arms are in alignment with the field, a 45° position is used to observe minimum power requirements, and a series connection of a velocity coil and a vane coil is used to insure equal current in both coils. Since a pointer movement of several degrees occurs at the moment the applied power is sufficient to overcome the static friction of the vane bearings, the minimum power required can be observed easily.

Static friction in the vane bearings sets the lower limit on the power necessary to operate the instrument. The upper power limit is a function of instrument size and of the life of component materials at higher temperatures.

Obviously many modifications and variations of the present invention are possible in the light of the above teachings. It is therefore to be understood that within the scope of the appended claims the invention may be practiced otherwise than as specifically described.

I claim:

1. A dynamometer for acoustic bearing determination for use with a sound detection system including first and second sound velocity detectors having mutually perpendicular orientation of their lobes of maximum sensitivity, a non-directional pressure signal detector having compensator means to correct amplitude and phase characteristics thereof to the amplitude and phase of the signals derived from such sound velocity detectors, and means to amplify and filter each of the three channels defined by said detectors, said dynamometer comprising a housing, an iron vane shaft mounted vertically rotatably in bearings in said housing, a vane coil encasing said vane shaft and adapted to be energized by such pressure signal detector, vane arms above and below said vane coil carried by said vane shaft, a first field coil secured to said housing and encasing said vane arm above said vane coil, a second field coil disposed at right angles to said first field coil and encasing said first field coil, a third field coil secured to said housing and encasing said vane arm below said vane coil, a fourth field coil disposed at right angles to said third field coil and encasing said third field coil, said first and third field coils being serially connected and similarly oriented, said second and fourth field coils being serially connected and similarly oriented, said first and third field coils being energized by such first velocity detector and said second and fourth field coils being energized by such second velocity detector, and means to indicate the orientation of said vane shaft.

2. The combination of claim 1 in which said vane shaft includes viscous means to damp rotation of said shaft.

3. The combination of claim 1 including a fin carried by said vane shaft and viscous dash pot means to damp rotation of said fin.

References Cited in the file of this patent

UNITED STATES PATENTS

| Number | Name | Date |
|---|---|---|
| 470,341 | Weston | Mar. 8, 1892 |
| 737,255 | Lloyd | Aug. 25, 1903 |
| 1,892,644 | Olson | Dec. 27, 1932 |
| 1,892,646 | Wolff | Dec. 27, 1932 |
| 2,300,814 | Scaife | Nov. 3, 1942 |
| 2,376,730 | Steinhoff | May 22, 1945 |